US012753638B2

(12) United States Patent
Xu

(10) Patent No.: US 12,753,638 B2
(45) Date of Patent: Oct. 6, 2026

(54) LOCK APPARATUS

(71) Applicant: WENZHOU JINFU LOCKS CO. LTD, Wenzhou (CN)

(72) Inventor: Juxiang Xu, Wenzhou (CN)

(73) Assignee: WENZHOU JINFU LOCKS CO. LTD, Wenzhou (CN)

( * ) Notice: Subject to any disclaimer, the term of this patent is extended or adjusted under 35 U.S.C. 154(b) by 5 days.

(21) Appl. No.: 18/956,209

(22) Filed: Nov. 22, 2024

(65) Prior Publication Data

US 2026/0146477 A1 May 28, 2026

(51) Int. Cl.
*E05B 67/06* (2006.01)

(52) U.S. Cl.
CPC .................................. *E05B 67/063* (2013.01)

(58) Field of Classification Search
CPC ..................................................... E05B 67/063
See application file for complete search history.

(56) References Cited

U.S. PATENT DOCUMENTS

2009/0135015 A1* 5/2009 Dobson .................... H04Q 9/00 340/572.9
2016/0053515 A1* 2/2016 Kindstrand ........... E05B 67/063 70/39
2016/0201357 A1* 7/2016 George ................... E05B 15/06 70/38 R
2016/0201386 A1* 7/2016 George ................... E05B 71/00 70/57
2019/0368225 A1* 12/2019 Perrenoud ............... E05B 71/00

FOREIGN PATENT DOCUMENTS

CN 216841070 U 6/2022
TW 202308883 A 3/2023

* cited by examiner

*Primary Examiner* — Mark A Williams
(74) *Attorney, Agent, or Firm* — MH2 Technology Law Group LLP

(57) ABSTRACT

Disclosed is a lock apparatus, relating to the field of home appliances and overcomes the drawback of insufficient anti-cutting strength of conventional shackles. The disclosed shackle includes a primary structure, the primary structure including two engaging heads inserted into the lock body for being engagingly locked and a link segment which is located between the two engaging heads and exposed out of the lock body, the link segment having at least one arcuate bent section; a diamond layer is applied to a surface of the link segment, a thickness B of the diamond layer being greater than or equal to 0.2 mm, a center radius R of the arcuate bent section being greater than or equal to 15 mm, a central angle of the arcuate bent section being in a range from 30° to 150°. The disclosure is mainly used for further enhancing the anti-cutting property of the shackle.

6 Claims, 4 Drawing Sheets

LOCK APPARATUS

FIELD

The subject matter described herein relates to lock apparatuses, and more particularly a U-lock.

BACKGROUND

A U-lock, which generally comprises a lock body and a shackle, is not only devised to prevent unauthorized, non-destructive/destructive bypass of the lock body, but also devised to prevent unauthorized, destructive cutting of the shackle; thusly, the shackle needs a particular hardening treatment.

For example, the patent literature TW202308883 discloses a lock comprising a lock body having a locking mechanism; and a coated shackle movable between a closed position and an open position in relation to the lock body, the shackle being lockable to the lock body at the closed position via the locking mechanism. The shackle is at least partially coated with a thermoplastic polyurethane-based coating to increase surface hardness of the shackle, giving shackle an excellent scratch-resistant property.

For another example, the patent literature CN216841070U discloses a destructive-bypass-resistant U-lock, comprising a latch and an anti-skid sleeve, an engaging slot being provided in each side of the latch, a first snap-fit being provided at an upper portion of an inner wall of the engaging slot, a second snap-fit being provided at a lower portion of the inner wall of the engaging slot, a U-lock body being engaged with the inner wall of the engaging slot, a first retention slot being provided at an outer wall of the U-lock body, a second retention slot being provided at the outer wall of the U-lock body. Due to provision of an anti-cutting layer formed of cotton thread, an electric or hand saw attempting to destructively bypass the U-lock first encounters the anti-cutting layer, where the cotton thread of the anti-cutting layer would be wound around the outer wall of the electric or hand saw, leading to malfunction of the electric or hand saw; in addition, the barrier layer as provided is formed of a high chromium cast steel material which has a high hardness and is resistant to direct cutting, with sparks and noises being generated during cutting easily giving an alarming effect.

However, in practice, the existing U-locks such as those described supra are not strong enough in their anti-cutting property. It is desirable to further improve the anti-cutting property of the shackle.

SUMMARY

Embodiments of the disclosure provide a lock apparatus, which overcomes the insufficient anti-cutting strength of shackles and further strengthens the anti-cutting property of shackles.

The disclosure adopts a technical solution infra: a lock apparatus comprising a lock body and a shackle, the shackle comprising a primary structure, the primary structure comprising two engaging heads inserted into the lock body for being engagingly locked and a link segment which is located between the two engaging heads and exposed out of the lock body, the link segment having at least one arcuate bent section, wherein a diamond layer is applied to a surface of the link segment, a thickness B of the diamond layer being greater than or equal to 0.2 mm, a center radius R of the arcuate bent section being greater than or equal to 15 mm, a central angle of the arcuate bent section being in a range from 30° to 150°.

With the technical solution noted supra, the disclosure offers the following advantages: the diamond layer of predetermined thickness B on the surface of the link segment is well resistant to unauthorized cutting with a conventional tool, so that the anti-cutting property of the shackle is notably enhanced. Meanwhile, the potentially breakable portion of the diamond layer is strengthened. By limiting the center radius R and the central angle of the arcuate bent section from being too small, the potential stress concentration arising during processing of the diamond layer is effectively eliminated, which enhances the anti-bashing and break-proof property of the diamond layer at the arcuate bent section and further improves safety of the lock apparatus.

Furthermore, the center radius R of the arcuate bent section is greater than or equal to a diameter D of the link segment. With this technical solution, by associating R with D, R may be adjusted for different models of lock apparatuses based on the diameter of the bar material used by the shackle, ensuring that the stress concentration issue does not easily occur when processing the diamond layer on the shackle of various models of lock apparatuses.

Furthermore, the thickness B of the diamond layer is in a range from 0.3 mm to 0.6 mm. With this technical solution, a tradeoff between the anti-cutting property and manufacturing cost of the diamond layer is achieved.

Furthermore, surfaces of ends of the engaging heads connected to the link segment are also applied with the diamond layer; and/or, an anti-rust coating is applied to an outer surface of the diamond layer. With this technical solution, the surfaces of the ends of the engaging heads connected to the link segment exposed out of the lock body are resistant to cutting, and the anti-rust coating may effectively prevent oxidization of the diamond layer and improve aesthetic appearance of the product.

Furthermore, the link segment comprises a first straight section and a second straight section, the two engaging heads being located at end portions of the first straight section and the second straight section, respectively, the first straight section and the second straight section being parallel disposed with a center distance S ranging from 60 mm to 150 mm. This technical solution limits the center distance S between the first straight section and the second straight section from being too small so as to prevent the center radius R of the arcuate bent section between the first straight section and the second straight section from being too small, while a too large center distance S is also not a good option because it increases the space for destructively breaking the portion between the first straight section and the second straight section.

Furthermore, the link segment further comprises a third straight section, both ends of the third straight section being connected to the first straight section and the second straight section via the arcuate bent sections, respectively.

Furthermore, a length L1 of the first straight section is identical to a length L2 of the second straight section, and the arcuate bent section has a central angle of 90°; or, a length L1 of the first straight section is greater than a length L2 of the second straight section, the arcuate bent section connected between the first straight section and the third straight section has an obtuse central angle, and the arcuate bent section connected between the second straight section and the third straight section has an acute central angle.

Furthermore, a length L1 of the first straight section is identical to a length L2 of the second straight section, the first straight section and the second straight section being connected via a plurality of arcuate bent sections with different center radii.

Furthermore, the link segment further comprises the third straight section and a fourth straight section, two ends of the third straight section being connected to the first straight section and the fourth straight section via the arcuate bent sections, respectively, two ends of the fourth straight section being connected to the second straight section and the third straight section via the arcuate bent sections, respectively.

Furthermore, a length L1 of the first straight section is identical to a length L2 of the second straight section, a length L3 of the third straight section is identical to length L4 of the fourth straight section, and central angles of all arcuate bent sections are acute.

BRIEF DESCRIPTION OF THE DRAWINGS

Hereinafter, the disclosure is further illustrated through drawings, among which.

DETAILED DESCRIPTION

To make the objectives, technical solutions, and advantages of the embodiments of the disclosure more apparent, the technical solutions in the embodiments of the disclosure will be described in a clear and comprehensive manner; it is apparent that the example embodiments described herein are only part of the embodiments of the disclosure, not all of them.

The terms like "first" and "second" (if existent) used in the specification and claims of the disclosure are used for distinguishing like objects, not necessarily used for describing a specific sequence or priority; even if an element is modified with "second" for distinguishing purposes, it does not necessarily imply existence of a "first" element. It will be understood that the terms "comprise" and "have," as well as any of their variants, intend for a non-exclusive inclusion. It will be understood that "plurality" refers to two or more. The term "and/or" only describes an association relationship between associated objects, which may encompass three relationships. For example, X and/or Y may represent: X individually, or both X and Y together, or Y individually. The symbol "/" generally represents an "or" relationship between the associated objects. The terms "comprising X, Y, and Z" and "comprising X, Y, Z" refer to comprising all the three elements; the term "comprising X, Y or Z" refers to comprising one of the X, Y, and Z; and the term "comprising X, Y and/or Z" refers to comprising any one, any two, or three of the X, Y, Z.

Hereinafter, the technical solution of the disclosure will be described in detail via specific example embodiments. The specific example embodiments as will be described below may be combined mutually or replaced with each other dependent on actual conditions; for same or similar concepts or processes, they may not be repeated in some example embodiments.

Figure 1:
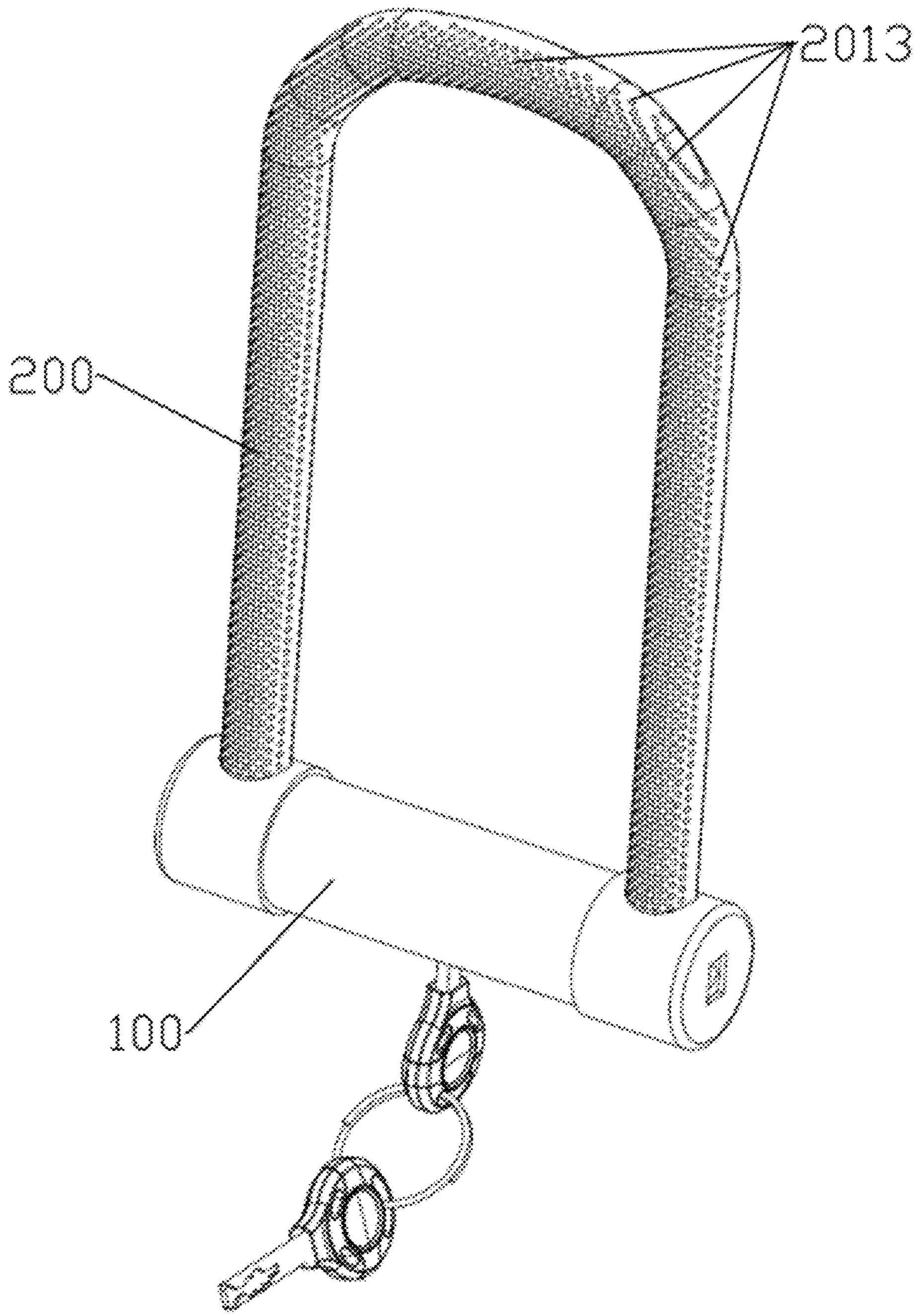
FIG. 1 is a schematic diagram of a lock apparatus according to the disclosure.
Figure 2:
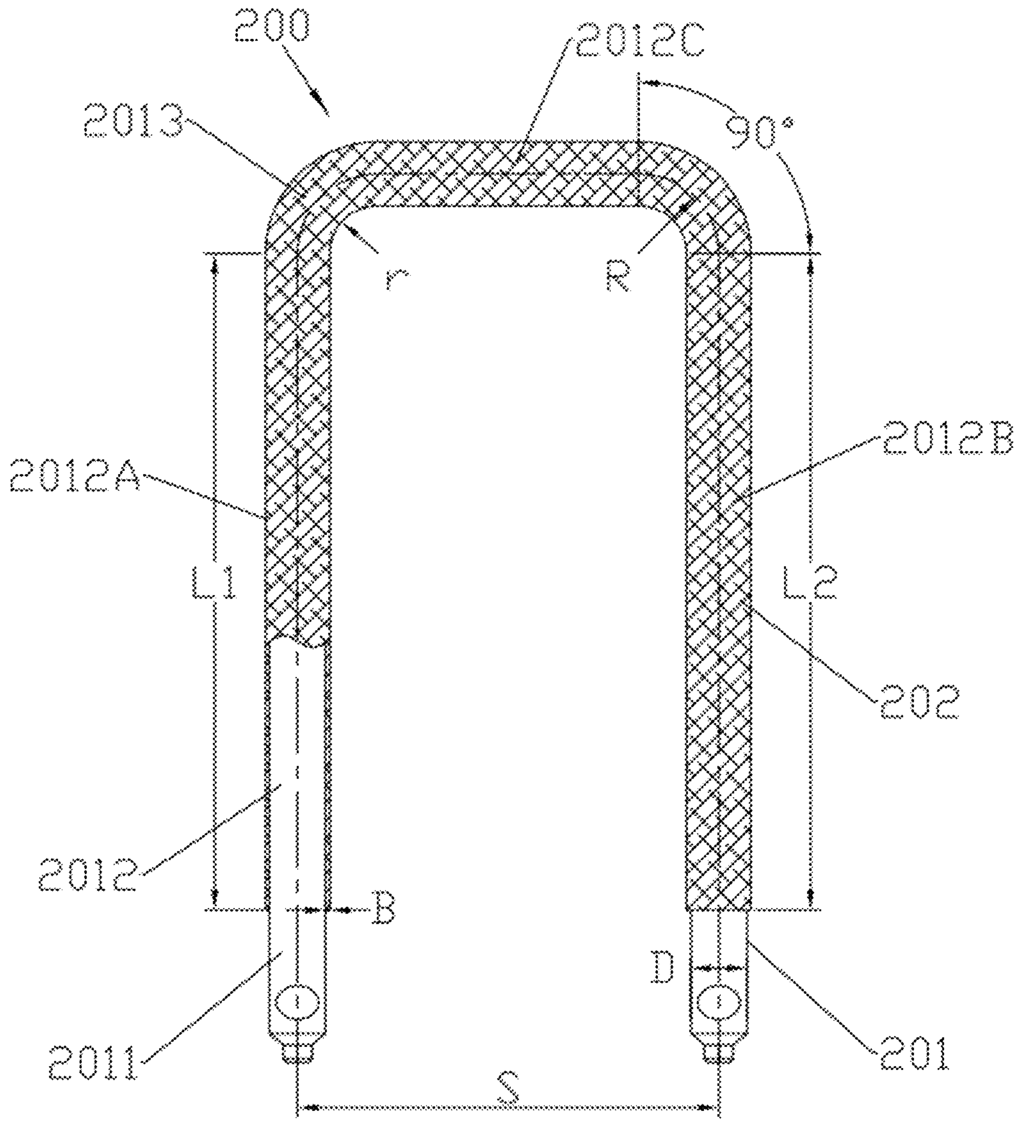
FIG. 2 is a first schematic diagram of a shackle according to the disclosure.

As illustrated in FIGS. 1 and 2, a lock apparatus according to the disclosure comprises a lock body 100 and a shackle 200, the shackle 200 comprising a primary structure 201, the primary structure 201 comprising two engaging heads 2011 which are inserted into the lock body 100 for being engagingly locked and a link segment 2012 which is located between the two engaging heads 2011 and exposed out of the lock body 100, the link segment 2012 having at least one arcuate bent section 2013, a diamond layer 202 being applied to a surface of the link segment 2012, a thickness B of the diamond layer 202 being greater than or equal to 0.2 mm, a center radius R of the arcuate bent section 2013 being greater than or equal to 15 mm, a central angle of the arcuate bent section 2013 being in a range from 30° to 150°.

Diamond is the naturally occurring hardest substance ever known. Due to its highest hardness, cutting and processing of diamond requires use of diamond powder or laser (e.g., laser with a wavelength of 532 mm or 1064 mm). In the disclosure, the shackle 200 provided with the diamond layer 202 of the predetermined thickness B on the surface of the link segment 2012 is well resistant to unauthorized cutting by a conventional tool. Testing reveals that one-hour cutting with a typical hacksaw substantially leaves no scratches on the surface of the diamond layer 202 of the shackle 200, so that the anti-cutting property of the shackle 200 is notably enhanced. The diamond layer 202 may be formed by typical brazing. A large difference in thermal expansion coefficient between the diamond layer and the primary structure would lead to a large welding residual stress, so that service efficiency and service life of the diamond layer depends on the firmness of diamond grits inset on the primary structure. A stress concentration issue likely arises during processing of the diamond layer 202, particularly at the inner peripheral side of the arcuate bent section 2013 of the link segment 2012, where the diamond layer 202 is more easily broken away from the primary structure 201 than at other positions; thusly, to prevent a potential unauthorized, destructive attack on the shackle 200 by bashing or other means such that the bashed diamond layer 202 at the position noted supra is likely broken away from the primary structure 201 causing protection failure of the diamond layer 202, this portion of the diamond layer 202 may be strengthened by increasing the thickness B of the diamond layer 202, which, however, may increase the manufacturing cost so that the product likely loses market competitiveness due to the overly high price, or by limiting the center radius R and the central angle of the arcuate bent section 2013 from being too small, which may effectively eliminate the potential stress concentration arising during processing of the diamond layer 202, thereby enhancing the anti-bashing and break-proof property of the diamond layer 202 at the arcuate bent section 2013 and further improving safety of the lock apparatus. Since the arcuate bent section 2013 is designed and processed with the center radius R as the design parameter, once the center radius R of the arcuate bent section 2013 and the diameter D of the link segment 2012 are determined, the radius r of the inner ring of the arcuate bent section 2013 is determined, whereby the technical effects noted supra are achieved.

The lock body 100 and the shackle 200 are generally engaged in the following two manners: firstly, both engaging heads of the shackle 200 are inserted into the lock body 100 to realize locking; or, one engaging head of the shackle 200 is hinged to the inside of the lock body 100 while the other engaging head is inserted into the lock body 100 to realize locking. Both engaging manners are applicable to the disclosure.

A diameter of the link segment 2012 is denoted by D. In one implementation, R is greater than or equal to D. By associating R with D, R may be adjusted for different models of lock apparatuses based on the diameter of the bar material used by the shackle 200, ensuring that the stress concentration issue does not easily occur when processing the diamond layer 202 on the shackle 200 of various models of lock apparatuses.

To achieve a tradeoff between the anti-cutting property and manufacturing cost of the diamond layer 202, in one implementation, B ranges from 0.3 mm to 0.6 mm, e.g., B=0.45.

Although break of the shackle 200 may be effectively prevented theoretically by applying the diamond layer 202 only on the surface of the link segment 2012, the shackle 200 is likely loosened relative to the lock body 100 over long-term service of the lock apparatus, causing the engaging heads 2011 partially exposed outside the lock body 100; as such, the diamond layer 202 may also be applied onto the surface of the ends of the engaging heads 2011 connected to the link segment 2012, which ensures that the portion of the engaging heads 2011 exposed outside the lock body 100 is also coated with the diamond layer 202, thereby preventing the exposed portion from being broken; of course, without considering the costs, the entire engaging heads 2011 may be applied with the diamond layer 202.

The diamond layer 202 is substantially composed of carbon, so that the surface of the diamond layer 202 is likely oxidized to a certain extent over long term service; therefore, anti-rust coating may be applied onto an outer surface of the diamond layer 202, for example, by nickel-plating, which may also improve aesthetic appearance of the product.

The shackle 200 is generally formed of a metallic round rod, e.g., steel rod. A typical shackle 200 available in the market generally has such a structure that the link segment 2012 comprises a first straight section 2012A and a second straight section 2012B, the two engaging heads 2011 being provided at corresponding ends of the first straight section 2012A and the second straight section 2012B, respectively, the first straight section 2012A and the second straight section 2012B being parallel disposed; to achieve a center radius R of the arcuate bent section 2013 that meets criteria, the center distance S between the first straight section 2012A and the second straight section 2012B should not be too small so as to prevent the center radius R of the arcuate bent section 2013 between the first straight section 2012A and the second straight section 2012B from being too small, while a too large center distance S is also not a good option because it increases the space for destroying a portion between the first straight section 2012A and the second straight section 2012B; therefore, a reasonable range of the center radius R is from 60 mm to 150 mm, e.g., S=60 mm, 80 mm, 105 mm, 120 mm, 135 mm, or 150 mm.

The structure connected between the first straight section 2012A and the second straight section 2012B may come in various forms.

In one implementation, the first straight section 2012A and the second straight section 2012B may be connected via a plurality of arcuate bent sections 2013 with different center radii, as illustrated in FIG. 1, where all arcuate bent sections 2013 have a relatively large center radius, and the arcuate bent section 2013 in the middle has the largest radius so that the stress arising during processing of the diamond layer 202 can be better released. In another implementation, as illustrated in FIG. 2, a length L1 of the first straight section 2012A is identical to a length L2 of the second straight section 2012B, and the link segment 2012 further comprises a third straight section 2012C, two ends of the third straight section 2012C being connected to the first straight section 2012A and the second straight section 2012B via the arcuate bend portion 2013, respectively; by providing that the length L1 of the first straight section 2012A is identical to the length L2 of the second straight section 2012B and the central angle of the arcuate bent section 2013 is 90°, the relatively simple structure facilitates processing.

Figure 3:
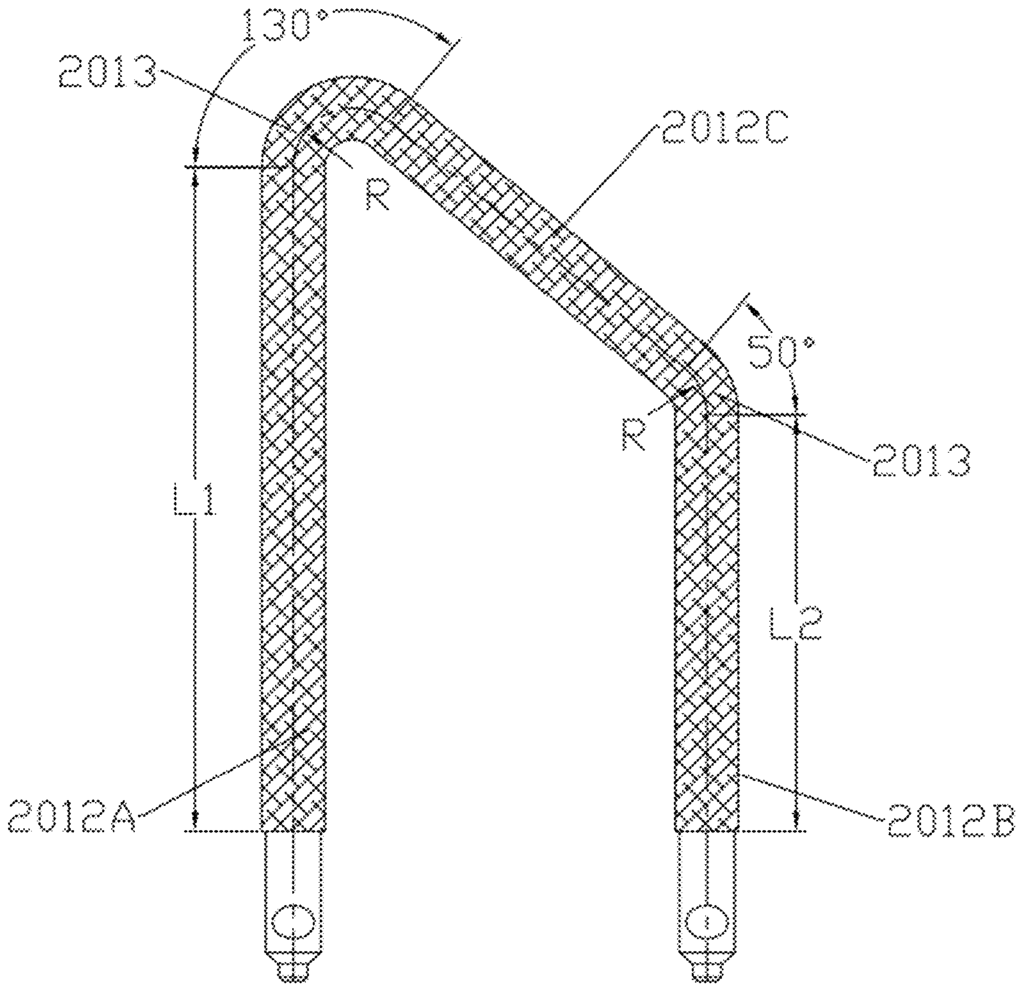
FIG. 3 is a second schematic diagram of a shackle according to the disclosure.

Likewise, the two ends of the third straight section 2012C are connected to the first straight section 2012A and the second straight section 2012B via the arcuate bent sections 2013, respectively, as further illustrated in FIG. 3, in another implementation, the length L1 of the first straight section 2012A is greater than the length L2 of the second straight section 2012B, the central angle of the arcuate bent section 2013 connected between the first straight section 2012A and the third straight section 2012C is obtuse, e.g., 130°, and the central angle of the arcuate bent section 2013 connected between the second straight section 2012B and the third straight section 2012C is acute, e.g., 50°.

Figure 4:
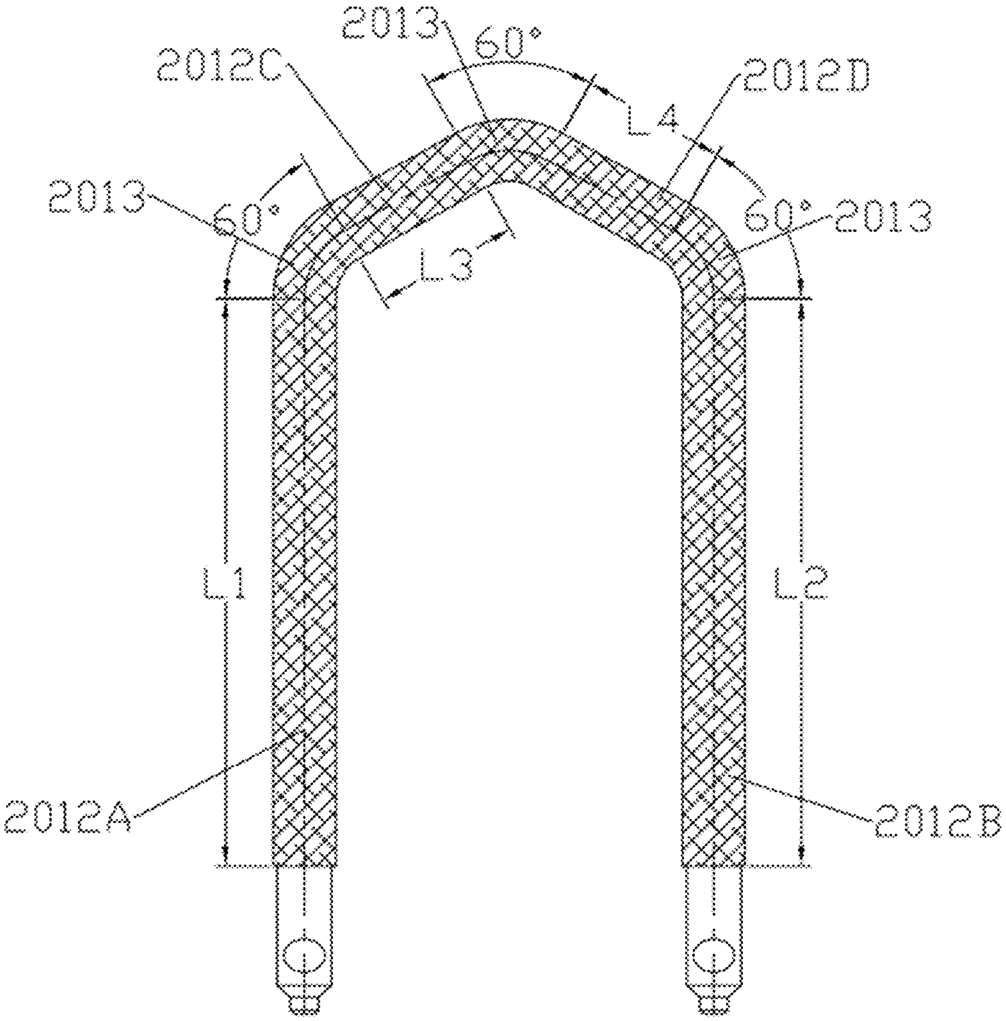
FIG. 4 is a third schematic diagram of a shackle according to the disclosure.

As further illustrated in FIG. 4, in another implementation, the link segment 2012 further comprises a third straight section 2012C and a fourth straight section 2012D, two ends of the third straight section 2012C being connected to the first straight section 2012A and the fourth straight section 2012D via the arcuate bent sections 2013, respectively, two ends of the fourth straight section 2012D being connected to the second straight section 2012B and the third straight section 2012C via the arcuate bent sections 2013, respectively. The length L1 of the first straight section 2012A is identical to the length L2 of the second straight section 2012B, the length L3 of the third straight section 2012C is identical to the length L4 of the fourth straight section 2012D, and the central angles of all the arcuate bent sections 2013 are acute, e.g., around 60°.

In addition to the example implementations, the shape of the shackle may also be varied dependent on actual needs. The disclosure further has other implementations. All other implementations derived by a person of normal skill in the art without exercise of inventive work fall within the scope of the disclosure.

I claim:

1. A U-lock apparatus, comprising a lock body and a shackle, the shackle comprising a primary structure, the primary structure comprising two engaging heads inserted into the lock body for being engagingly locked and a link segment which is located between the two engaging heads and exposed out of the lock body, the link segment having at least one arcuate bent section, wherein a diamond layer is applied to a surface of the link segment, a thickness B of the diamond layer being greater than or equal to 0.2 mm, a center radius R of the arcuate bent section being greater than or equal to 15 mm, a central angle of the arcuate bent section being in a range from 30° to 150°, the thickness B of the diamond layer is in a range from 0.3 mm to 0.6 mm; the link segment comprises a first straight section and a second straight section, the two engaging heads being located at end portions of the first straight section and the second straight section, respectively, the first straight section and the second straight section being parallel disposed with a center distance S ranging from 60 mm to 150 mm; the center radius R of the arcuate bent section is greater than or equal to a diameter D of the link segment; the link segment further comprises a third straight section, both ends of the third straight section being connected to the first straight section and the second straight section via the arcuate bent sections, respectively.

2. The U-lock apparatus according to claim 1, wherein surfaces of ends of the engaging heads connected to the link segment are also applied with the diamond layer; and/or, an anti-rust coating is applied to an outer surface of the diamond layer.

3. The U-lock apparatus according to claim 1, wherein a length L1 of the first straight section is identical to a length L2 of the second straight section, and the arcuate bent section has a central angle of 90°; or, a length L1 of the first straight section is greater than a length L2 of the second straight section, an arcuate bent section connected between the first straight section and the third straight section has an obtuse central angle, and an arcuate bent section connected between the second straight section and the third straight section has an acute central angle.

4. The U-lock apparatus according to claim 1, wherein a length L1 of the first straight section is identical to a length L2 of the second straight section, the first straight section and the second straight section being connected via a plurality of arcuate bent sections with different center radii.

5. A U-lock apparatus, comprising a lock body and a shackle, the shackle comprising a primary structure, the primary structure comprising two engaging heads inserted into the lock body for being engagingly locked and a link segment which is located between the two engaging heads and exposed out of the lock body, the link segment having at least one arcuate bent section, wherein a diamond layer is applied to a surface of the link segment, a thickness B of the diamond layer being greater than or equal to 0.2 mm, a center radius R of the arcuate bent section being greater than or equal to 15 mm, a central angle of the arcuate bent section being in a range from 30° to 150°, the thickness B of the diamond layer is in a range from 0.3 mm to 0.6 mm; the link segment comprises a first straight section and a second straight section, the two engaging heads being located at end portions of the first straight section and the second straight section, respectively, the first straight section and the second straight section being parallel disposed with a center distance S ranging from 60 mm to 150 mm; the center radius R of the arcuate bent section is greater than or equal to a diameter D of the link segment; and the link segment further comprises the third straight section and a fourth straight section, two ends of the third straight section being connected to the first straight section and the fourth straight section via the arcuate bent sections, respectively, two ends of the fourth straight section being connected to the second straight section and the third straight section via the arcuate bent sections, respectively.

6. The U-lock apparatus according to claim 5, wherein a length L1 of the first straight section is identical to a length L2 of the second straight section, a length L3 of the third straight section is identical to a length L4 of the fourth straight section, and central angles of all the arcuate bent sections are acute.

* * * * *